Figure 1:
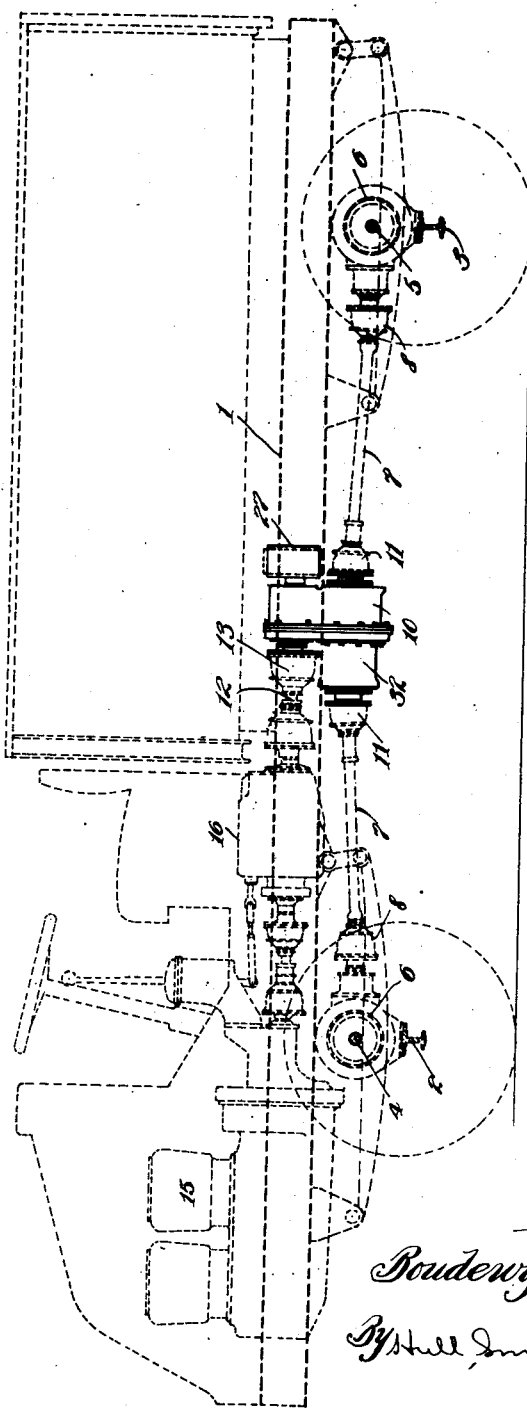

B. B. NEUTEBOOM.
POWER TRANSMITTING MECHANISM.
APPLICATION FILED JUNE 3, 1918.

1,392,439.

Patented Oct. 4, 1921.

3 SHEETS—SHEET 1.

Inventor,
Boudewijn B. Neuteboom.
By Hull, Smith, Brock & West
Attys.

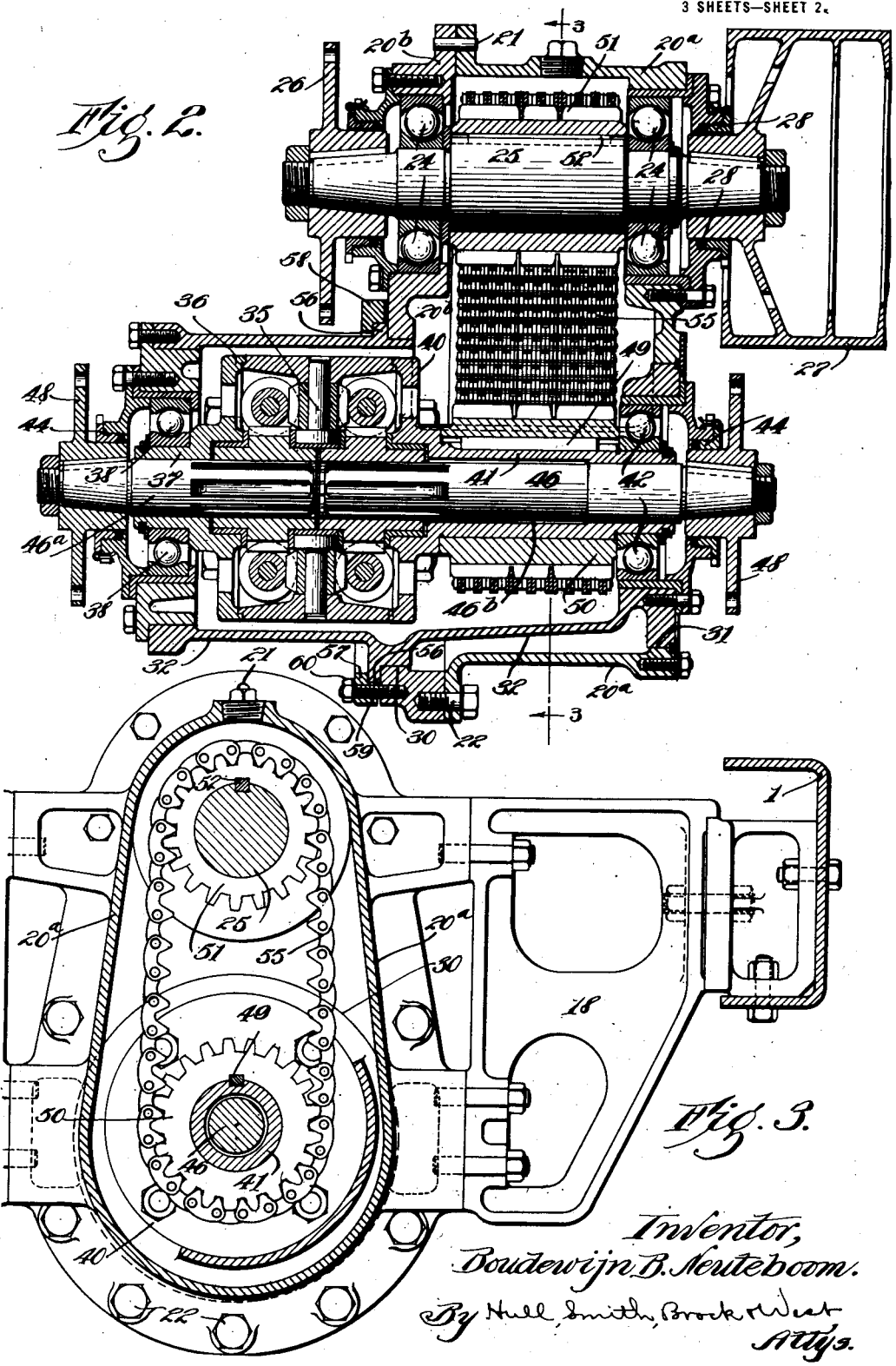

B. B. NEUTEBOOM.
POWER TRANSMITTING MECHANISM.
APPLICATION FILED JUNE 3, 1918.

1,392,439.

Patented Oct. 4, 1921.

3 SHEETS—SHEET 3.

Inventor,
Boudewijn B. Neuteboom.
By Still, Smith, Brock & West
Attys.

UNITED STATES PATENT OFFICE.

BOUDEWIJN B. NEUTEBOOM, OF DETROIT, MICHIGAN, ASSIGNOR TO THE MILITOR CORPORATION, OF NEW YORK, N. Y., A CORPORATION OF NEW YORK.

POWER-TRANSMITTING MECHANISM.

1,392,439.     Specification of Letters Patent.     Patented Oct. 4, 1921.

Application filed June 3, 1918. Serial No. 237,963.

*To all whom it may concern:*

Be it known that I, BOUDEWIJN B. NEUTEBOOM, a subject of the Queen of the Netherlands, residing at Detroit, in the county of Wayne and State of Michigan, have invented a certain new and useful Improvement in Power-Transmitting Mechanisms, of which the following is a full, clear, and exact description, reference being had to the accompanying drawings.

This invention relates to a power transmitting mechanism that is peculiarly adapted to motor trucks or vehicles, and has to do more particularly with an adjustment for incorporation in power transmitting mechanisms of this character.

The objects of the invention are to construct a power transmitting mechanism involving power transmitting elements that are thoroughly incased to the exclusion of dust and dirt and to the inclusion of a suitable lubricant, and yet which are capable of adjustment to vary their relation without its being necessary to open the casing; to provide mechanism of the aforesaid character that is easily accessible at all times; that is convenient of manipulation; and that is so designed and constructed as to insure alinement of bearings and parallelism of the shafts throughout the range of adjustment of the mechanism.

In its present preferred form my invention consists, essentially, of what I may term a drive shaft and a driven shaft, each having a member over which is engaged a flexible power transmitting element, a housing wherein one of the shafts is journaled and which, in turn, is journaled within bearings of a casing on an axis parallel, but eccentric, with respect to said shaft, the other shaft being journaled within the casing on a parallel axis to the former shaft so that by turning the housing within its bearings the shafts may be moved relatively toward and from each other without disturbing their parallel relation while effecting a loosening or tightening of the flexible element; and my invention further comprehends the provision of a convenient means for locking the housing in any adjusted position.

In the foregoing embodiment, a chain constitutes the flexible element, and the eccentricity of the bearing of the housing with respect to that of the shaft which it supports affords an adjustment substantially equal to the length of a link of the chain, so that, through the adjustment of the housing and the shortening or lengthening of the chain and by the removal or insertion of links, any desired degree of adjustment from the greatest to the smallest may be accomplished.

In the accompanying drawings I have illustrated constructions wherein the objects above enumerated are attained, and while I shall proceed to describe these constructions in detail, I wish to be understood as not limiting myself to their structural details further than is required by the terms of the claims annexed hereto.

Figure 4:
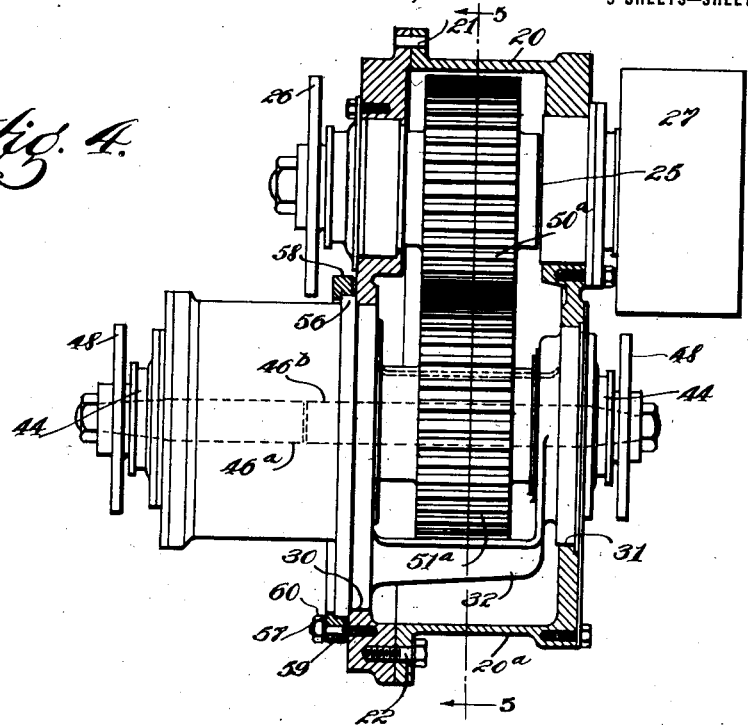
Figure 5:
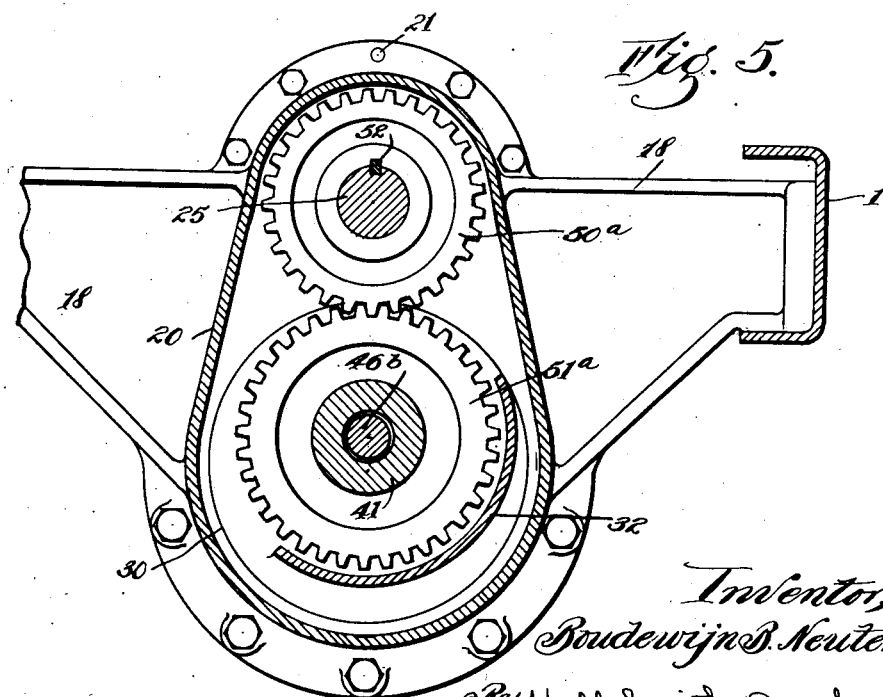

In the drawings, Figure 1 is a dotted line side elevational view of a motor driven vehicle having my improved power transmitting mechanism, shown in full lines, incorporated therein; Fig. 2 is a central longitudinal section of the mechanism; Fig. 3, a section on the line 3—3 of Fig. 2; and Figs. 4 and 5 are views, similar respectively to Figs. 2 and 3, of a modification.

Because of its peculiar adaptability to such a construction, I have shown my invention incorporated in a motor driven truck or vehicle of the four-wheel-drive variety. The vehicle frame or chassis is designated 1, the front axle 2, and the rear axle 3. Above the respective axles are the wheel driving shafts 4 and 5. Each wheel driving shaft is composed, as usual, of two sections that are coupled together through differential mechanisms, indicated generally at 6, and the differential mechanisms that are driven through the sectional shafts 7, the sections whereof are connected through the universal joints 8, all of which is in accordance generally with prevailing practice and is therefore deemed unnecessary of a more detailed description.

My improved power transmitting mechanism is in general designated 10, and the driven shaft thereof is connected, through the universal joints 11, with the shafts 7; while what I may term the driving shaft has connection, through a shaft 12, having universal joints 13, with the power plant of the vehicle comprising generally the engine 15 and the change-speed gearing 16 which may be of any approved type.

Supported by and between the opposed side members of the frame or chassis 1, through brackets 18, is a casing 20, made up of the parts 20ª and 20ᵇ that are shown as properly alined and connected by the dowel pins 21 and studs 22.

Shown as journaled in suitable anti-friction bearings 24 in the upper end of the casing 20 is the driving shaft 25 of my power transmitting mechanism. The shaft extends forward of the casing where it has secured to it the flange element 26 of the adjacent universal joint 13, previously referred to, and where the shaft extends rearwardly from the casing it has attached to it a drum 27 of a suitable brake mechanism (not shown). The openings of the casing through which the ends of the shaft 25 project are equipped with packing glands indicated generally at 28.

The lower portions of the opposed end walls of the casing 20 have circular apertures 30 and 31 which are in axial alinement; and journaled within these apertures are spaced annular bearing portions of a housing 32 that is generally of cylindrical form. Within an extended portion of the housing 32, forward of the casing 20, is a differential mechanism designated generally at 35, and which may be of any satisfactory type. The present mechanism is shown as as involving an end member 36 having a sleeved hub 37 that is journaled in an anti-friction bearing 38, set within an aperture in the forward end of the housing 32; and an opposed end member 40 having an elongated sleeved hub section 41 that is likewise supported with an anti-friction bearing 42, reposing within an aperture of the rear end of the housing. Suitable glands 44 close the ends of the housing 32 against the ingress of dust or dirt and the egress of oil or other lubricant. It may be noted that, for structural reasons, the forward end wall of the housing 32 consists of a removable annulus 45, while the rear end wall thereof is made integral with the housing.

The driven shaft 46, which is constituted of the sections 46ª and 46ᵇ, is slidably journaled within the sleeved hubs 37 and 41 of the members 36 and 40, respectively, of the differential mechanism, and the outer ends of the two sections have secured to them the flanges 48 of the universal joints 11.

Secured, as by a key 49, to the elongated sleeved hub 41 of the member 40 is a gear 50, and a similar gear 51 is secured, as by a key 52, to the driving shaft 25. In the preferred embodiment, a flexible power transmitting element 55, shown in the present instance in the form of a "so-called" noiseless chain, is engaged about the gears 50 and 51 so that the rotation of the driving shaft is transmitted through said element, and through the differential mechanism 35, to the driven shaft 46. As will be seen upon reference to Fig. 3 a part of the cylindrical wall of the housing 22 within the casing 20 is omitted to permit the passage of the flexible element or chain 55. Also it will be observed in the same figure that the annular bearing portions of the housing 32 are eccentric with respect to the shaft 46, wherefore a rotary adjustment of the housing within the casing will effect the movement of the shaft 46 toward or from the shaft 25, and a consequential loosening or tightening of the flexible element or chain 55.

Immediately outside the casing section 20ᵇ, the housing 32 is provided with a circumferential flange 56 that is adapted to be clamped between the adjacent face of the casing member and a shoulder 57 of a ring 58 that is secured to the casing member by studs 59, to the outer threaded ends of which are applied nuts 60. To adjust the housing within its bearings it is only necessary to loosen the nuts 60 and thus free the flange 56 when the casing may be bodily turned to vary the tension of the flexible element or chain 55, as above explained. After the adjustment is made the nuts are tightened to securely clamp the flange 56 between the shoulder of the ring and the casing member.

From the foregoing description it will be seen that a very convenient means is provided for adjusting the chain or flexible driving element, and one which may be manipulated at any time and without opening the casing inclosing the working parts of the mechanism.

Upon reflection it will be seen that the mechanism herein described is especially suitable for incorporation in motor driven vehicles for the reasons that the mechanism, which is carried by the frame or chassis, has connection with the wheel driving parts that are carried by the vehicle axles through a shaft arrangement which elongates and shortens in accordance with usual motor vehicle practice to compensate for the constantly changing relation between the frame or chassis and axles from which the chassis is spring suspended, wherefore a shifting of the shaft 46 for adjustment purposes does not in any way affect the driving connections.

Attention is also called to the fact that the adjustment of the flexible element or chain does not disturb the alinement of the shaft bearings, as would be the case if the shaft bearings were adjusted independently of each other.

In the modification illustrated in Figs. 4 and 5, the driving and the driven shafts have secured to them the respective gears 50ª and 51ª, the gears meshing to transmit power from the former to the latter shaft. In other respects the present form of the invention is substantially identical with the previous form, wherefore similar reference characters are used to designate corresponding parts in the two embodiments.

The principal advantage of the adjustment obtained through the eccentrically journaled housing in the latter modification is that it permits gears varying somewhat in size from that specified to be used, thus obviating the extreme accuracy demanded in the absence of such an adjustment, thereby greatly facilitating the assembly of the mechanism and cheapening its manufacture.

Having thus described my invention, what I claim is:—

1. In power transmitting mechanism for motor vehicles, the combination of a casing supported by the chassis of the vehicle, a driving shaft rotatably supported by the casing and having operative connection with the power plant, a member journaled within the casing on an axis parallel to that of the driving shaft, a driven shaft journaled within said member eccentric with respect to the journals of said member but parallel to the axis thereof, driving connections between the shafts and located within the casing, and means exterior of the casing for rotating the member within the casing, the driven shaft having connection with the driving wheels of the vehicle.

2. In power transmitting mechanism for motor vehicles, the combination of a casing carried by the chassis of the vehicle, a member journaled within said casing, a shaft journaled within said member and eccentric with respect to the journals thereof but having its axis parallel to the axis of said member, a shaft journaled within the casing in parallel relation to the former shaft and driving connections between said shafts and located within the casing, one of said shafts having operative connection with the power plant of the vehicle, and the other having operative connection with the driving wheels thereof.

3. In power transmitting mechanism for motor vehicles, the combination of a casing supported by the chassis of the vehicle, a member journaled within said casing and adapted to be angularly adjusted from the exterior of the casing, means exterior of the casing for locking the member in any adjusted position, a shaft journaled in said member eccentric with respect to the bearings thereof and having its axis parallel to the axis of said member, a shaft journaled within the casing in parallel relation to the former shaft, driving connections between said shafts, one of said shafts having operative connection with the power plant of the vehicle, and the other having operative connection with the driving wheels thereof.

4. In power transmitting mechanism for motor vehicles, the combination of a casing, a pair of shafts rotatably supported within said casing and capable of adjustment toward and from each other, a driving member carried by each shaft and located within the casing, a flexible driving element engaged about said driving members, and means outside the casing for adjusting the distance between the shafts thereby to regulate the tension of the flexible driving element, one of said shafts having operative connection with the power plant of the vehicle, and the other having operative connection with the driving wheels thereof.

5. In power transmitting mechanism, the combination of a casing having bearing apertures in opposed walls thereof and that are in axial alinement, a member extending through said casing and having spaced portions journaled in said apertures, a shaft journaled within said member and eccentric with respect to the bearings of said member but in parallel relation to the axis thereof, a shaft journaled within the casing in parallel relation to the former shaft, and driving connections between said shafts.

6. In power transmitting mechanism, the combination of a casing having bearing apertures in its opposed walls and that are in axial alinement with each other, a member extending through said casing and having spaced portions journaled within said bearing apertures, said member having a flange adjacent the outer surface of one of the side walls of the casing, a member adjustably secured to said casing wall for clamping between said wall and itself the flange of the member, a shaft journaled within said member eccentric with respect to the bearings thereof and in parallel relation to the axis of said member, a second shaft journaled within the casing in parallel relation to the former shaft, and driving connections between said shafts.

7. In power transmitting mechanism, the combination of a normally closed casing having bearing apertures in opposed walls thereof, a housing extending through the casing and journaled within said apertures and normally closed except within the casing, a shaft journaled within the housing in eccentric relation to the bearings of the housing but parallel to the axis thereof, a shaft journaled within the casing in parallel relation to the former shaft, a driving member carried by each shaft, a flexible driving element engaged about said members, and means exterior of the casing for adjusting the housing within its bearings.

8. In power transmitting mechanism, the combination of a normally closed casing having bearing apertures in opposed walls thereof, a housing extending through the casing and journaled within said apertures and normally closed except within the casing, a shaft journaled within the housing in eccentric relation to the bearings of the housing but parallel to the axis thereof, a shaft journaled within the casing in parallel relation to the former shaft, driving connections between said shafts, means exterior of the casing for adjusting the housing within its bearings, and further means outside the casing for locking the housing in any adjusted position.

9. In power transmitting mechanism, the combination of a casing having bearing apertures in its opposed walls, bearings journaled within said apertures, a shaft journaled within said bearing in eccentric relation to the apertures wherein the bearings are journaled but parallel to the axes thereof, a shaft journaled within the casing in parallel relation to the former shaft, driving connections between said shafts, and means for adjusting said bearings within the apertures of the casing in unison.

10. In power transmitting mechanism, the combination of a casing having bearing apertures in its opposed walls, bearings journaled within said apertures, a shaft journaled within said bearings in eccentric relation to the apertures wherein the bearings are journaled but parallel to the axes thereof, a shaft journaled within the casing in parallel relation to the former shaft, driving connections between said shafts, and means outside the casing for adjusting said bearings within the apertures of the casing in unison.

11. In power transmitting mechanism, the combination of a casing having bearing apertures in its opposed walls that are in axial alinement, one of said apertures being of greater diameter than the other, a cylindrical housing extending through said casing and having spaced portions journaled within said apertures, the housing being provided with a circumferential flange engaging the outer side of the casing wall having the aperture of greater diameter, a ring surrounding the housing and embracing the circumferential flange thereof, means for adjustably securing said ring to the casing whereby the flange of the housing may be clamped between the ring and the adjacent wall of the casing, a shaft journaled within the housing in parallel relation to the axis of the housing but eccentric with respect to the bearing portions thereof, a shaft journaled within the casing in parallel relation to the former shaft, and driving connections between said shafts.

12. In power transmitting mechanism for motor vehicles, the combination of a casing, a pair of shafts rotatably supported within said casing and capable of adjustment toward and from each other, driving connections between said shafts, and means of adjustment outside the casing for varying the distance between the shafts, one of said shafts having operative connection with the power plant of the vehicle, and the other having operative connection with the driving wheels thereof.

13. In power transmitting mechanism, the combination of a normally closed casing having bearing apertures in its opposed walls, a housing extending through the casing and journaled within said apertures and normally closed except within the casing, a shaft journaled within the housing in eccentric relation to the bearings of the housing but parallel to the axis thereof, a shaft journaled within the casing in parallel relation to the former shaft, driving connections between said shafts, and means exterior of the casing for adjusting the housing within its bearings.

In testimony whereof, I hereunto affix my signature.

BOUDEWIJN B. NEUTEBOOM.